US009824057B2

(12) United States Patent
Luo

(10) Patent No.: US 9,824,057 B2
(45) Date of Patent: Nov. 21, 2017

(54) INTEGRATED CIRCUIT FOR RELYING SIGNAL OVER USB CONNECTOR WITH SIGNAL HAVING NOTCH AT FREQUENCY OF WIRELESS BAND WITH TRANSFER RATE HIGHER THAN FREQUENCY OF USB HIGH-SPEED INTERCONNECT

(71) Applicant: MEDIATEK INC., Hsin-Chu (TW)

(72) Inventor: Yan-Bin Luo, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 111 days.

(21) Appl. No.: 14/434,535

(22) PCT Filed: Mar. 4, 2014

(86) PCT No.: PCT/CN2014/072858
§ 371 (c)(1),
(2) Date: Apr. 9, 2015

(87) PCT Pub. No.: WO2015/131332
PCT Pub. Date: Sep. 11, 2015

(65) Prior Publication Data
US 2016/0246752 A1  Aug. 25, 2016

(51) Int. Cl.
*G06F 13/00*  (2006.01)
*G06F 13/42*  (2006.01)
(Continued)

(52) U.S. Cl.
CPC ........ *G06F 13/4282* (2013.01); *G06F 13/385* (2013.01); *H04L 1/205* (2013.01);
(Continued)

(58) Field of Classification Search
CPC .......... G06F 1/04; G06F 1/08; G06F 13/4282; G06K 19/07732; H04L 1/205
(Continued)

(56) References Cited

U.S. PATENT DOCUMENTS 7,434,083 B1 * 10/2008 Wilson ............... G06F 1/08
375/130
7,558,311 B2 * 7/2009 Shin ................... H03B 23/00
375/130
(Continued)

FOREIGN PATENT DOCUMENTS

CN  101739061  6/2010
CN  102843168 A  12/2012

OTHER PUBLICATIONS

"USB 3.0 Radio Frequency Interference Impact on 2.4 GHz Wireless Devices" Intel, Apr. 2012, pp. 1-22.*
(Continued)

Primary Examiner — Tammara Peyton
(74) Attorney, Agent, or Firm — Wolf, Greenfield & Sacks, P.C.

(57) ABSTRACT

The present invention provides integrated circuit and apparatus having USB connector; the integrated circuit includes a signaling circuit and an interface for relaying signal between the USB connector and the signaling circuit, wherein an interconnect scheme of the signaling circuit is different from USB interconnect defined by USB specification; for example, a frequency adopted for signaling can be programmable, be lower than wireless band and/or be different from a frequency of USB SuperSpeed interconnect.

11 Claims, 5 Drawing Sheets

(51) Int. Cl.
*H04L 1/20* (2006.01)
*G06F 13/38* (2006.01)
*H04L 29/08* (2006.01)
*H04W 72/04* (2009.01)
*H04W 72/08* (2009.01)

(52) U.S. Cl.
CPC ......... *H04L 67/12* (2013.01); *H04W 72/0453* (2013.01); *H04W 72/082* (2013.01); *G06F 2213/0042* (2013.01)

(58) Field of Classification Search
USPC ................................................. 710/106–108
See application file for complete search history.

(56) References Cited

U.S. PATENT DOCUMENTS

| | | | | |
|---|---|---|---|---|
| 7,953,175 | B2* | 5/2011 | Hariton | H04L 1/205 375/295 |
| 8,499,186 | B2* | 7/2013 | Tseng | G06F 1/08 331/158 |
| 2006/0098714 | A1 | 5/2006 | Shin et al. | |
| 2006/0158268 | A1* | 7/2006 | McCorquodale | G06F 1/04 331/34 |
| 2006/0294272 | A1* | 12/2006 | Chou | G06K 19/07732 710/62 |
| 2008/0215907 | A1 | 9/2008 | Wilson | |
| 2009/0028218 | A1 | 1/2009 | Hariton et al. | |
| 2010/0088454 | A1 | 4/2010 | Chang et al. | |
| 2011/0138214 | A1 | 6/2011 | Tseng et al. | |
| 2014/0181337 | A1 | 6/2014 | Zou et al. | |

OTHER PUBLICATIONS

International Search Report PCT/ISA/210 for PCT/CN2013/083287.

International Search Report PCT/ISA/220 for PCT/CN2013/083287.

International Search Report PCT/ISA/237 for PCT/CN2013/083287.

Extended European Search Report for Application No. 14833448.5 dated Aug. 9, 2017.

* cited by examiner

US 9,824,057 B2

INTEGRATED CIRCUIT FOR RELYING SIGNAL OVER USB CONNECTOR WITH SIGNAL HAVING NOTCH AT FREQUENCY OF WIRELESS BAND WITH TRANSFER RATE HIGHER THAN FREQUENCY OF USB HIGH-SPEED INTERCONNECT

This application is the 35 U.S.C. §371 national stage of PCT application PCT/CN2014/072858, filed Mar. 4, 2014, the disclosure of which is hereby incorporated by reference.

FIELD OF INVENTION

The present invention relates to an integrated circuit and associated apparatus, and more particularly, to an integrated circuit and associated apparatus mechanically interfacing standard USB (Universal Serial Bus) connector but electrically signaling differently from USB specification.

BACKGROUND OF THE INVENTION

As more and more electronic apparatuses of different dimensions, functions, and manufacturers prevail in modern information society, they demand standardized connection mechanism to interconnect with each other for interaction and/or cooperation. One of the most used connection standards is USB (Universal Serial Bus) standard defined by USB specification, which is developed and maintained by USB Implementers Forum, Inc.

A connection standard is implemented by mechanical connector and electrical signaling. Mechanical connector defines dimensions of plugs and receptacles. Electrical signaling defines general interconnect scheme, e.g., the manner in which devices (peripheral apparatuses) connect to and communicate with host (a central apparatus), including topology of interconnection (e.g., star topology and/or daisy chain), involved communication layers, relationship and interaction between the communication layers for accomplishing information exchange, as well as roles of interconnect participants (e.g., host, hub and/or device).

For example, regarding mechanical connector, USB 3.0 specification defines the following connectors: USB 3.0 standard-A plug and receptacle, USB 3.0 standard-B plug and receptacle, USB 3.0 powered-B plug and receptacle, USB 3.0 micro-B plug and receptacle, USB 3.0 micro-A plug and USB 3.0 micro-AB receptacle, etc. Regarding electrical signaling, USB 3.0 (and 3.1) specification defines SuperSpeed interconnect besides low-speed, full-speed and high-speed interconnects of USB 2.x specification. The USB SuperSpeed interconnect architecture includes communication layers like physical layer, link layer and protocol layer; mechanism for robustness and power management; participants such as peripheral devices, hubs and hosts; and data flow model.

While standardized mechanical connector facilitates product design and lowers manufacturing cost and effort for different electronic apparatuses, electrical signaling of the same standard can hardly satisfy various demands of different electronic apparatuses. For example, the 5.0 GHz frequency of USB SuperSpeed interconnect can cause EMI (Electromagnetic Interference) to degrade functionalities which rely on wireless connection.

SUMMARY OF THE INVENTION

Therefore, the present invention removes unnecessary binding between USB connector and USB signaling; while USB connector is exploited, USB signaling (interconnect scheme) does not have to be followed.

An objective of the invention is providing an integrated circuit, including a signaling circuit for signaling with a signal (e.g., transmitting and/or receiving a signal), and an interface coupled to the signaling circuit for relaying the signal between a USB connector and the signaling circuit; wherein a frequency of the signal is lower than a frequency of a wireless band. For example, the wireless band can be ISM (Industrial, Scientific and Medical) band; and/or, the wireless band can be a band allocated for wireless positioning, satellite positioning, WiFi and/or mobile telecommunication, e.g., LTE (Long-Term Evolution). In an embodiment, the interface is arranged to relay signal (e.g., a differential signal including two complementary signals) between a number (e.g., two) of SuperSpeed pins of the USB connector and the signaling circuit.

An objective of the invention is providing an integrated circuit including a signaling circuit for signaling under a predetermined interconnect scheme which rules manner of signal connection and communication, and an interface for relaying signal between a USB connector and the signaling circuit; wherein the predetermined interconnect scheme is incompatible with USB interconnect (e.g., USB SuperSpeed interconnect) defined by USB specification (e.g., USB 3.0 and/or 3.1 specification currently known). For example, the signaling circuit can adopt interconnect scheme of PCIe (Peripheral Component Interconnect express) 1.x, which utilizes a frequency of 2.5 GHz for signaling, rather than 5 Ghz of USB SuperSpeed interconnect. PCIe standard is developed and maintained by PCI-SIG (PCI Special Interest Group).

An objective of the invention is providing an integrated circuit including a signaling circuit for signaling with a programmable frequency, and an interface for interfacing the signaling circuit with a USB connector; wherein the signaling circuit is further arranged to program the programmable frequency of signaling, such that the programmable frequency is different from a frequency of USB interconnect, e.g., a frequency of USB SuperSpeed interconnect. For example, the programmable frequency can be programmed to avoid wireless band. The programmable frequency can be programmed by selecting among multiple predetermined frequencies.

An objective of the invention is providing an electronic apparatus including a USB connector and a signaling circuit for signaling via the USB connector, wherein a manner in which the signaling circuit signals is different from that defined by USB specification. For example, the signaling circuit can be arranged (programmed) to signal with a frequency different from that used by USB specification.

Numerous objectives, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION

Figure 1:
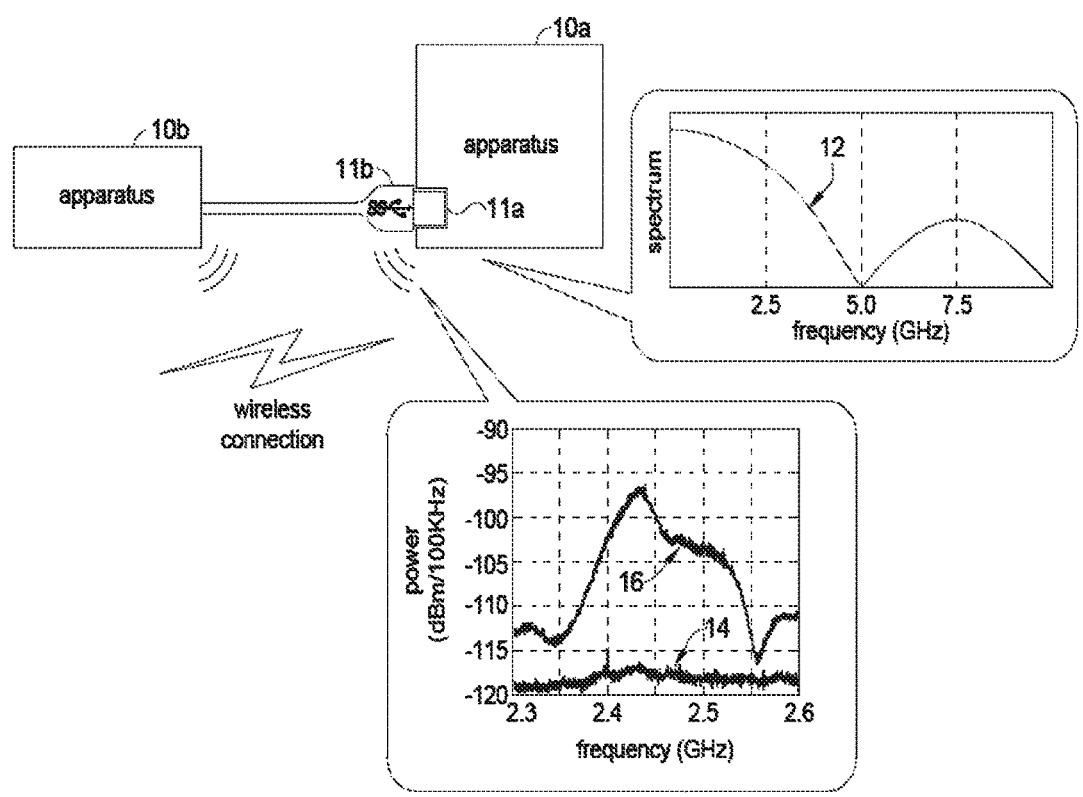
FIG. 1 illustrates interference caused by USB 3.0 signaling.

Please refer to FIG. 1 illustrating EMI owing to signaling of USB SuperSpeed interconnect. In FIG. 1, two apparatuses 10a and 10b are connected by two mating USB connectors 11a and 11b (e.g., a receptacle and a plug), and thus establish standard USB SuperSpeed interconnect following USB 3.0 specification. For example, the apparatuses 10a and 10b can respectively be a host computer and an external hard disk drive. A curve 12 in FIG. 1 demonstrates a signaling spectrum of SuperSpeed interconnect, which can be modeled as a sinc function with notches separated by 5 GHz, since SuperSpeed interconnect transfers data at speed of 5 Gbps (gigabits per second). Note that the spectrum maintains considerable amplitude across 2.4 GHz, and hence leaks to form electromagnetic wave interfering RF (Radio Frequency) band of 2.4 GHz, which is widely adopted by many short-range wireless connections, such as Bluetooth, IEEE 802.11 wireless local network, sensor network and WiFi (developed and maintained by Wi-Fi Alliance), etc.

While a curve 14 in FIG. 1 shows RF background noise power near the apparatuses 10a and 10b when SuperSpeed interconnect is absent, a curve 16 demonstrates RF noise power when SuperSpeed interconnect is established and active. Comparing the curves 14 and 16, it is recognized that signaling of USB SuperSpeed interconnect will severely increase noise (interference) at a band between 2.4 and 2.5 GHz, and therefore degrade quality of nearby wireless connection. For example, as the apparatuses 10a and 10b interchanges data via the USB connectors 11a and 11b with signaling of USB SuperSpeed interconnect, the apparatus 10a may also need a wireless connection to a third apparatus (not shown); however, signaling of USB SuperSpeed interconnect will interfere such wireless connection to compromise its signal quality, and hence the apparatus 10a can not accomplish desired functionality.

Figure 2:
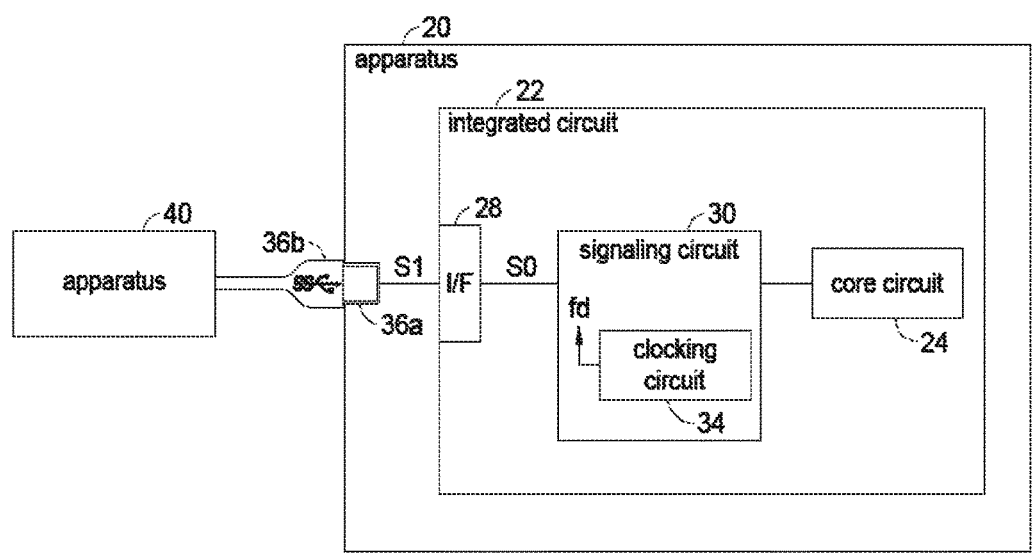
FIG. 2 illustrates an integrated circuit and an associated apparatus according to an embodiment of the invention.

Please refer to FIG. 2 illustrating an apparatus 20 according to an embodiment of the invention. The apparatus 20, e.g., a consumer electronic product such as a mobile phone, a tablet computer, a hand-held computer, a portable computer or a notebook computer, includes an integrated circuit 22 and a connector 36a compliant to USB mechanical specification, such that another apparatus 40 with another mating USB connector 36b can be attached to the apparatus 20, and the apparatuses 20 and 40 can cooperate by exchanging (sending and/or receiving) information such as packets, commands, instructions, messages, data, audio/video steams, etc.

Despite that the apparatuses 20 and 40 connect via mechanical connectors 36a and 36b of USB specification, electrical signaling via the connectors 36a and 36b is arranged not to follow USB specification, so as to avoid disadvantages of standard USB interconnect, such as EMI caused by USB SuperSpeed interconnect. That is, the apparatuses 20 and 40 interconnect following a customized interconnect scheme which is different from the interconnect scheme defined by USB specification, e.g., the SuperSpeed interconnect defined by USB 3.0 specification or advanced interconnect defined by later USB specification (e.g., USB 3.1 specification).

In the apparatus 20, the integrated circuit 22, such as a die, a chip, a CPU (Central Processing Unit), an SOC (System On Chip), a controller, an application processor or a baseband processor, includes a core circuit 24, a signaling circuit 30 and an interface 28. The signaling circuit 30 is coupled between the core circuit 24 and the interface 28. The interface 28 is coupled to the connector 36a and thus interfaces the signaling circuit 30 with the connector 36a. The core circuit 24 governs operation of the integrated circuit 22, and is bridged to the connector 36a by the signaling circuit 30 and the interface 28. For example, the signaling circuit 30 can be a PHY (physical layer) circuit including signal receiving and/or transmitting circuitry. The interface 28 can includes internal nodes (contacts) coupled to the signaling circuit 30, as well as ESD (Electro-Static Discharge) protection circuitry and external I/O (Input and/or Output) pads (not shown) coupled to the connector 36a, such that the interface 28 can relay signal between the signaling circuit 30 and the connector 36a.

Between the apparatuses 20 and 40, if the core circuit 24 of the apparatus 20 needs to send information to the apparatus 40, the signaling circuit 30 signals with a signal S0 in response to the information, the interface 28 relays the signal S0 as a signal S1 to the connector 36a; via the connector 36b, the apparatus 40 can then receive the information of the apparatus 20. If the core circuit 24 of the apparatus 20 needs to receive information from the apparatus 40, a signal S1 sent to the connector 36a by the apparatus 40 is relayed by the interface 28 and therefore causes signaling of a signal S0 in the signaling circuit 30; accordingly, the core circuit 24 can obtain the information of the apparatus 40.

Because the apparatuses 20 and 40 follow customized interconnect scheme different from standard USB interconnect (e.g., SuperSpeed interconnect), signaling of the signaling circuit 30 is arranged to be different from signaling of standard USB physical layer. In an embodiment, the signaling circuit 30 is arranged to signal with a frequency fd lower than 5.0 GHz of SuperSpeed interconnect of USB 3.0 specification. The frequency fd reflects data transfer rate between the apparatuses 20 and 40, and can be supplied by a clock circuit 34, e.g., a clock generator, a DLL (Delay Lock Loop), a PLL (Phase Lock Loop) and/or an SSCG (Spread Spectrum Clock Generator), included in the signaling circuit 30. By signaling with a lower frequency, EMI to nearby wireless connection can be effectively suppressed or avoided. For example, the signaling circuit 30 can be arranged to exploit interconnect scheme of PCIe 1.x, which utilizes 2.5 GHz for signaling. Thus, spectrum of signaling will notch near 2.5 GHz to avoid EMI leakage at commonly used RF band of 2.4 to 2.5 GHz.

The frequency fd of the signaling circuit 30 can also be arranged to avoid (e.g., to notch near) other wireless (RF) bands, such as bands allocated for Bluetooth, WiFi, mobile telecommunication (e.g., LTE) and/or satellite positioning system (e.g., Global Positioning System, GPS). In an embodiment, the frequency fd is a programmable frequency which can be programmed to be different from frequency of USB interconnect (e.g., SuperSpeed interconnect of USB 3.0/3.1 specification), so as to prevent side effects caused by signaling of USB interconnect. In an embodiment, the frequency fd is programmed by selecting among multiple predetermined frequencies, each predetermined frequency is arranged for an associated application scenario. For example, if the apparatus 20 needs to operate in company with a Bluetooth connection, the frequency fd can be programmed to a first predetermined frequency which notches near wireless band of Bluetooth; if the apparatus 20 needs to further operate in company with GPS, the frequency fd can be programmed to a second predetermined frequency which notches near wireless band of GPS; because band of GPS is lower than band of Bluetooth, the second predetermined frequency can be lower than the first predetermined frequency.

In an embodiment, the signaling circuit 30 is arranged to support multiple kinds of interconnect schemes other than interconnects of USB specification. For example, the signaling circuit 30 can be designed to support both PCIe 1.x and PCIe 2.x interconnect schemes which adopt different frequencies for data transfer (transaction). The signaling circuit 30 can be controlled to switch among different interconnect schemes for different application scenarios. In an embodiment, the apparatuses 20 and 40 can follow a predetermined protocol to negotiate supported interconnect scheme(s) of the other; if both apparatuses support a same interconnect scheme, they can switch to that interconnect scheme for information exchange. For example, the apparatuses 20 and 40 can first negotiate whether both sides allow (and/or demand) interconnect scheme of PCIe 2.x, if any side fails to comply (or does not prefer) interconnect scheme of PCIe 2.x, both sides can transit to interconnect scheme of PCIe 1.x. The core circuit 24 can include management circuitry (not shown) for implement aforementioned negotiation and transition of interconnect schemes. In an embodiment, the signaling circuit 30 not only supports interconnect scheme(s) other than those defined by USB specification, but also supports interconnect scheme(s) complying with USB specification, e.g., SuperSpeed, high-speed, full-speed and/or low-speed interconnects.

In addition to the clocking circuit 34, the signaling circuit 30 can further include circuitry implementing other PHY elements (not shown), such as encoding and/or decoding (e.g., 8b/10b codec), scrambling and/or descrambling, CDR (Clock Data Recovery), serializing and/or de-serializing, and/or data buffering (e.g., elasticity buffering). Since signaling of the signaling circuit 30 can be different from signaling of USB interconnect (e.g., SuperSpeed interconnect), some or all the PHY elements of the signaling circuit 30 can operate in manners different from those described in USB specification. And/or, the signaling circuit 30 can be built by PHY element(s) designed for connection standard(s) other than USB.

Because many modern connection standards are architected by similar PHY elements, the signaling circuit 30 can be designed to support interconnect schemes of different standards with only minor (or almost minimized) overhead. Different standards may need same PHY element to operate in similar or identical principle but with different parameters; therefore, the signaling circuit 30 can include programmable circuitry (not shown) which can operate in demanded principle with parameters programmed according to which standard is currently applied, so the same circuitry can support multiple connection standards.

In association with PHY elements of the signaling circuit 30, the core circuit 24 can include mechanism for implementing communication layers other than physical layer, including MAC (Media Access Control) layer, link layer, and/or protocol layer higher than physical layer. Because the signaling circuit 30 can utilize interconnect scheme different from USB interconnect, communication layers implemented by the core circuit 24 does not have to follow USB interconnect. For example, packets can be formed, formatted and/or framed in a manner different from USB SuperSpeed interconnect; link can be initialized, maintained, controlled, managed and/or terminated in a manner different from USB SuperSpeed interconnect; and/or, power management and/or link error handling can be performed in a manner different from USB SuperSpeed interconnect.

If the signaling circuit 30 is capable of supporting PHY functionality of multiple interconnect schemes, the core circuit 24 can implement corresponding functionality of higher layer(s) for the supported interconnect schemes, so as to manage PHY functionality of each interconnect scheme.

Figure 3:
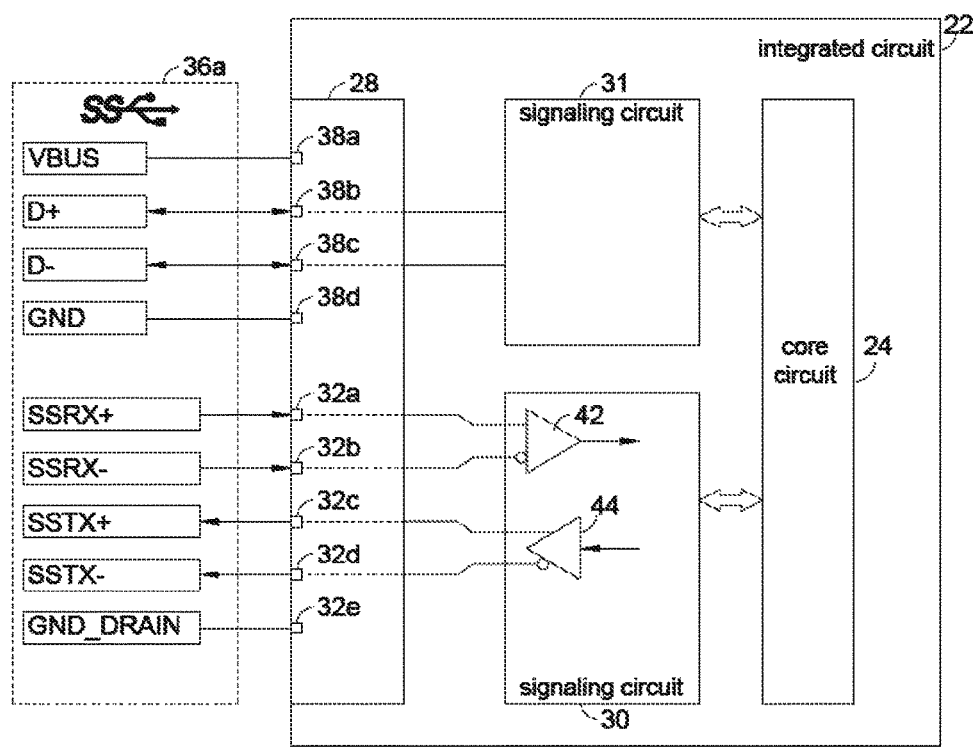
FIG. 3 illustrates pin usage of USB connector according to an embodiment of the invention.

Following the embodiment shown in FIG. 2, please refer to FIG. 3 exemplifying how standard USB connector can be utilized for signaling. In the example of FIG. 3, the connector 36a is a connector compliant to USB 3.0 specification, and includes pins (e.g., conductive fingers) VBUS, D+, D−, GND as well as pins SSRX+, SSRX−, SSTX+, SSTX− and GND_DRAIN. The interface 28 includes pads 32a to 32e respectively connected to the pins SSRX+, SSRX−, SSTX+, SSTX− and GND_DRAIN. The pins SSRX+, SSRX−, SSTX+ and SSTX− (and associated wires in USB 3.0 cable, not shown) are designed for differential receiving and transmitting of USB SuperSpeed interconnect, and the signaling circuit 30 can exploit these pins for interconnect scheme(s) different from SuperSpeed interconnect. For example, the signaling circuit 30 can include a transmitter 44 for transmitting a pair of differential signals to the pins SSTX+ and SSTX− via the pads 32c and 32d, and include a receiver 42 for receiving a pair of differential signals from the pins SSRX+ and SSRX− via pads 32a and 32b; the transmitter 44 and the receiver 42 can work simultaneously to implement full-duplex communication. Instead of 5 GHz of USB SuperSpeed interconnect, the transmitter 44 and the receiver 42 can adopt interconnect scheme of PCIe 1.x which operates at a lower frequency, e.g., 2.5 GHz; hence, the pins the pins SSRX+, SSRX−, SSTX+, SSTX− form a lane of PCIe interconnect.

Besides PCIe interconnect, other interconnect scheme can be adopted using the pins SSRX+, SSRX−, SSTX+, SSTX−. For example, the signaling circuit 30 can include two transceivers (not shown) of half-duplex, a first transceiver successively receives and transmits a pair of differential signals via the pins SSRX+ and SSRX−, and a second transceiver successively receives and transmits another pair of differential signals via the other two pins SSTX+ and SSTX−.

Figure 4:
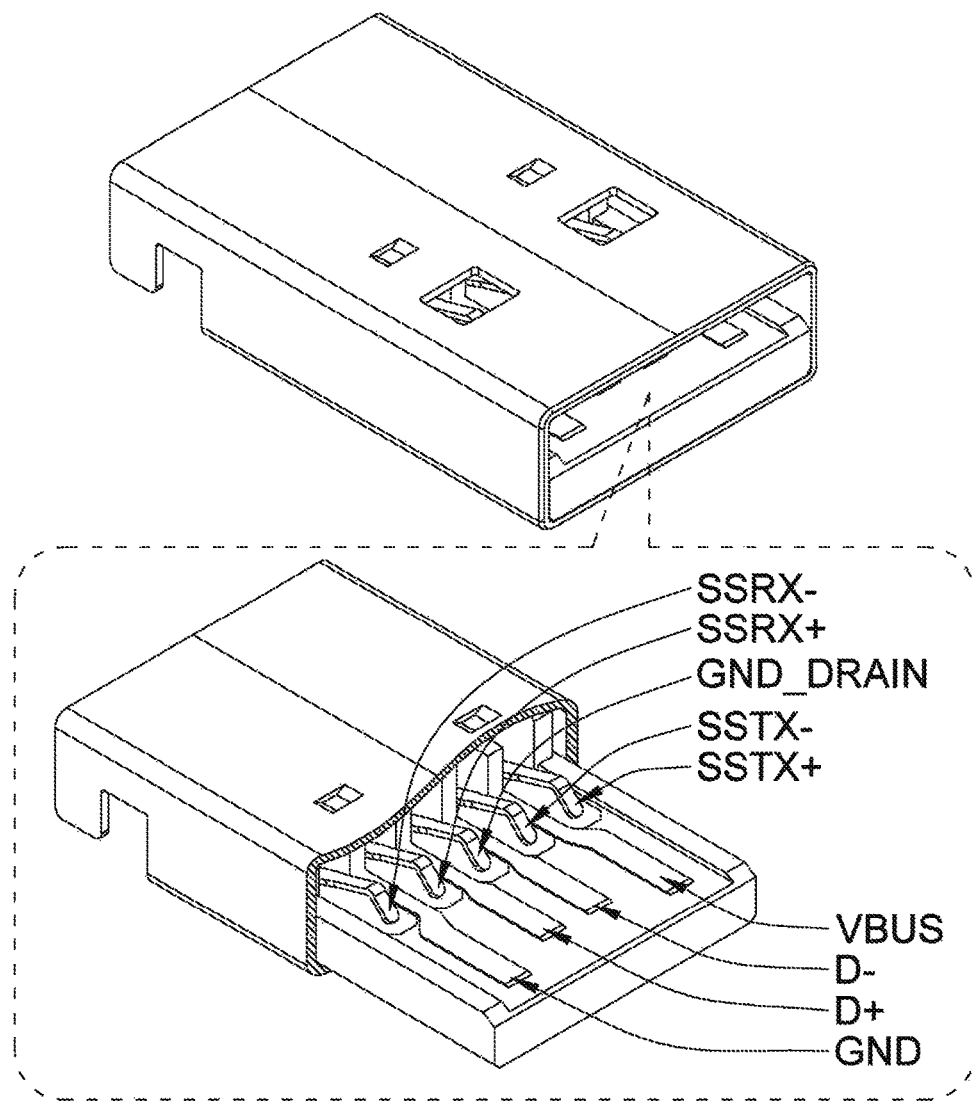
FIG. 4 and FIG. 5 illustrate embodiments of the connector shown in FIG. 2.
Figure 5:
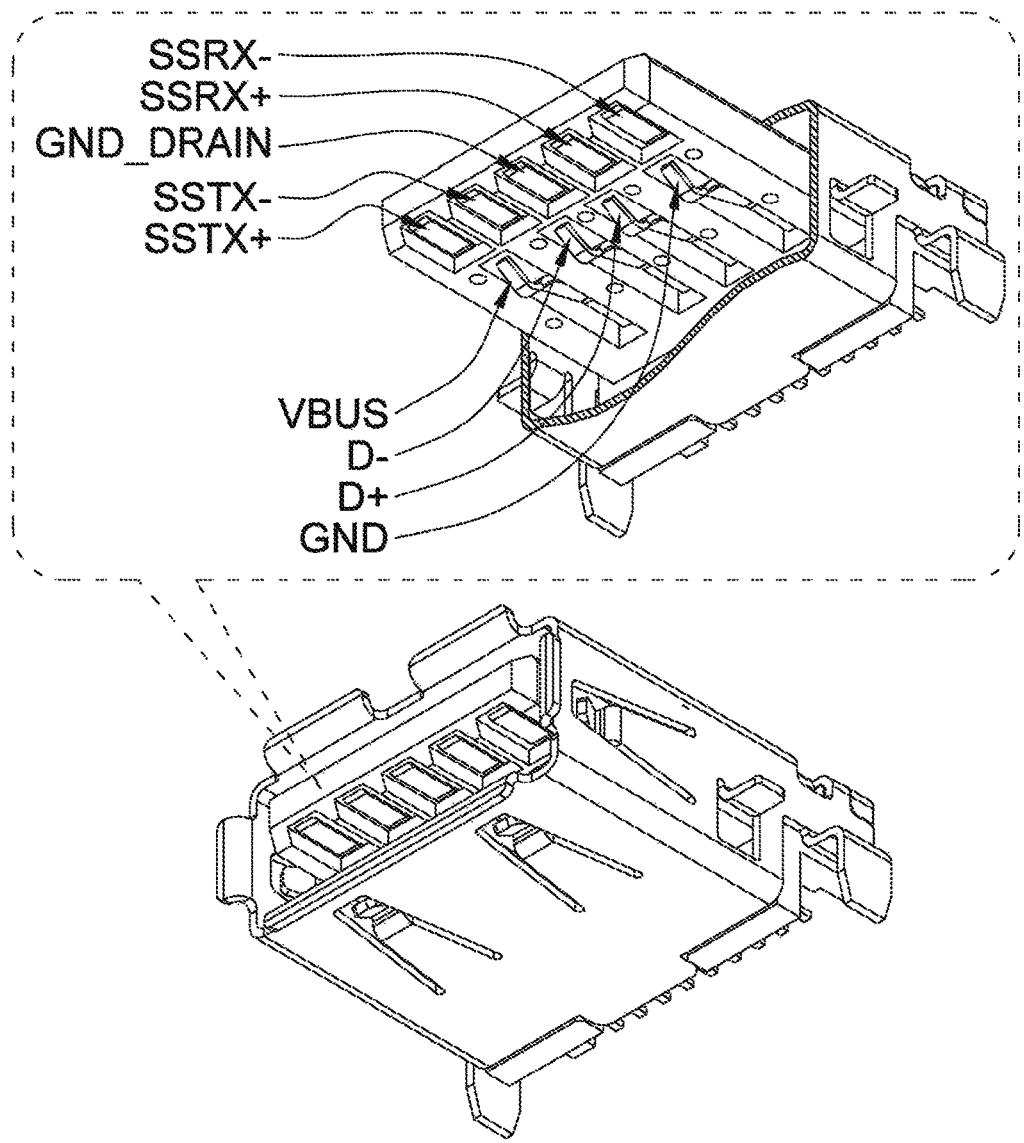

While the connector 36a also includes the pins VBUS, GND, D+, and D− for legacy interconnect of USB 2.x, the signaling circuit 30 can optional include an additional signaling circuit 31 coupled to the pins VBUS, D+, D− and GND via pads 38a to 38d optionally included in the interface 28. The signaling circuit 31 can signal via pins D+ and D− following interconnect scheme(s) of USB 2.x, and/or following interconnect scheme(s) different from any USB interconnect. The signaling circuit 31 can be omitted and the pins D+ and D− are left unused. The connector 36a can be a USB plug or a USB receptacle, for example, a USB 3.0 standard-A plug shown in FIG. 4 or a USB 3.0 standard-A receptacle shown in FIG. 5.

To sum up, the invention provides technique mechanically interfacing via popular USB connector but electrically signaling with interconnect scheme(s) different from USB interconnect, e.g., with interconnect scheme(s) different from SuperSpeed interconnect of USB 3.x specification. Exploiting USB connector helps to reduce cost, time and resources of product design and manufacturing, and adopting interconnect scheme other than USB effectively avoids limitations and/or disadvantages of USB interconnect, such as EMI.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

The invention claimed is:

1. An integrated circuit comprising:
a signaling circuit for signaling with a signal; and
an interface coupled to the signaling circuit, for relaying the signal over a Universal Serial Bus (USB) connector, wherein the signal has a notch at a frequency of a wireless band, and a data transfer rate of the signal is higher than a frequency of a USB high-speed interconnect.

2. The integrated circuit of claim 1, wherein the wireless band is allocated for satellite positioning.

3. The integrated circuit of claim 1, wherein the wireless band is an ISM (Industrial, Scientific and Medical) band.

4. The integrated circuit of claim 1, wherein the wireless band is allocated for mobile telecommunication.

5. The integrated circuit of claim 1, wherein the wireless band is allocated for WiFi.

6. The integrated circuit of claim 1, wherein the interface is arranged to relay the signal between a number of SuperSpeed pins of the USB connector and the signaling circuit.

7. An integrated circuit comprising:
a signaling circuit for signaling under a predetermined interconnect scheme which rules a manner of signal connection and communication; and
an interface coupled to the signaling circuit, for relaying a signal over a USB connector, wherein the signal has a notch at a frequency of a wireless band, and the data transfer rate of the signal is higher than a frequency of a USB high-speed interconnect,
wherein the predetermined interconnect scheme is incompatible with a USB interconnect defined by a USB specification.

8. An integrated circuit comprising:
a signaling circuit for signaling with a programmable data transfer rate, and
an interface coupled to the signaling circuit, for interfacing the signaling circuit with a USB connector;
wherein the signaling circuit is further arranged to program the programmable data transfer rate to be different from a frequency of a USB interconnect, to avoid interfering with a wireless band, and to be higher than a frequency of a USB high-speed interconnect.

9. The integrated circuit of claim 8, wherein the frequency of the USB interconnect is a frequency of a USB SuperSpeed interconnect.

10. An apparatus comprising:
a USB connector; and
a signaling circuit for signaling via the USB connector with a signal, wherein the signal has a notch at a frequency of a wireless band, and the data transfer rate of the signal is higher than a frequency of a USB high-speed interconnect;
wherein a manner in which the signaling circuit signals is different from that defined by a USB specification.

11. The apparatus of claim 10, wherein the signaling circuit is arranged to signal with a data transfer rate different from that used by a USB specification.

* * * * *